(12) United States Patent
Joo

(10) Patent No.: US 7,884,808 B2
(45) Date of Patent: Feb. 8, 2011

(54) COVER FOR A MOBILE DEVICE AND MOBILE DEVICE HAVING SAME

(75) Inventor: Won Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 11/846,348

(22) Filed: Aug. 28, 2007

(65) Prior Publication Data

US 2008/0223708 A1  Sep. 18, 2008

(30) Foreign Application Priority Data

Mar. 16, 2007  (KR)  ........................ 10-2007-0026328

(51) Int. Cl.
*G06F 3/041* (2006.01)
(52) U.S. Cl. .................. 345/173; 345/169; 361/681
(58) Field of Classification Search ......... 345/156–158, 345/173–179; 361/681; 455/556.1
See application file for complete search history.

(56) References Cited

U.S. PATENT DOCUMENTS

| | | | |
|---|---|---|---|
| 6,992,659 B2 * | 1/2006 | Gettemy | 345/173 |
| 7,348,964 B1 * | 3/2008 | Gettemy et al. | 345/173 |
| 2003/0117376 A1 | 6/2003 | Ghulam | |
| 2004/0042160 A1 * | 3/2004 | Yang et al. | 361/681 |
| 2006/0109258 A1 * | 5/2006 | Takisawa | 345/173 |
| 2006/0250354 A1 * | 11/2006 | Takata et al. | 345/156 |
| 2010/0053854 A1 * | 3/2010 | Nishikawa et al. | 361/679.01 |

FOREIGN PATENT DOCUMENTS

| | | |
|---|---|---|
| WO | WO-00/55716 A1 | 9/2000 |
| WO | WO-2004/003836 A1 | 1/2004 |
| WO | WO-2006/104293 A1 | 10/2006 |

* cited by examiner

*Primary Examiner*—Kimnhung Nguyen
(74) *Attorney, Agent, or Firm*—Birch, Stewart, Kolasch & Birch, LLP

(57) ABSTRACT

A cover for a mobile device is provided. The cover includes a support member having an upper surface, and a touch sensitive portion located on the upper surface of the support member, the touch sensitive portion being configured to generate a signal when touched to control the mobile device. A mobile device is also provided. The mobile device has a cover including a support member having an upper surface, and a touch sensitive portion located on the upper surface of the support member, the touch sensitive portion being configured to generate a signal when touched to control the mobile device. The mobile device also includes a display unit located in the mobile device.

25 Claims, 4 Drawing Sheets

COVER FOR A MOBILE DEVICE AND MOBILE DEVICE HAVING SAME

CROSS REFERENCE TO RELATED APPLICATIONS

This application claims priority to Korean Application No. 10-2007-0026328 filed Mar. 16, 2007, which is herein incorporated by reference.

BACKGROUND OF THE INVENTION

1. Field of the Invention

The present invention relates generally to a cover for a mobile device and a mobile device having the same, and more particularly, to a cover for a mobile device having a touch sensitive portion to generate input when being touched and a mobile device having the same.

2. Description of Related Art

A related art portable terminal includes a terminal housing, a display disposed to be exposed to the exterior of the terminal housing to display information, a touch pad attached to a surface of the display to generate input when being touched, and a side key mounted at a side surface of the terminal housing to generate a signal when being pushed.

The touch pad is formed of a transparent material, such that information displayed on the display may be seen from the exterior. Generally, the touch pad is fixedly adhered to an edge of an upper surface of the display by an adhesive, such as double-sided tape.

However, in the related art portable terminal, only a size corresponding to that of the display can be used as a touch area since the touch pad is attached to the front surface of the display.

Further, in addition to the touch pad, a push-sensitive side-key is mounted at the side surface of the terminal housing to generate input, thereby increasing manufacturing cost, requiring a complicated manufacturing process, and resulting in a poor design.

Further, the total thickness of the terminal is increased by the thickness of the touch pad and the thickness of the double-sided adhesive tape connecting the display and the touch pad. As a result of the thickness of the doubled-sided adhesive tape, a certain distance between the display and the touch pad is created.

BRIEF SUMMARY OF THE INVENTION

Accordingly, in order to solve the above-mentioned problems, one aspect of the present invention is directed to a cover for a mobile device. The cover includes a support member having an upper surface, and a touch sensitive portion located on the upper surface of the support member, the touch sensitive portion being configured to generate a signal when touched to control the mobile device.

In a further aspect, the touch sensitive portion may be located on the entire upper surface.

In a different aspect, the support member may be curved.

In yet another aspect, the support member may include at least one side surface, and the touch sensitive portion may be at least partially located on the at least one side surface.

In another aspect, the cover may include a protection film located on a surface of the touch sensitive portion, and the protection film may include a printed layer. The touch sensitive portion may be located on a surface of the printed layer of the protection film. The protection film may be integrally molded with the support member by in-mold injection.

In a different aspect, the cover may include connecting terminals connected to the touch sensitive portion, the connecting terminals being configured to transmit a touch signal from the touch sensitive portion to a circuitry supporting substrate. The connecting terminals may be integrally molded with the support member when the support member is molded. Terminal holes may be located in the support member, and the connecting terminals may be inserted into the terminal holes and electrically connected to the touch sensitive portion.

Another aspect of the present invention is directed to a mobile device. The mobile device has a cover including a support member having an upper surface, and a touch sensitive portion located on the upper surface of the support member, the touch sensitive portion being configured to generate a signal when touched to control the mobile device. The mobile device also includes a display unit located in the mobile device.

In a further aspect, the support member may include at least one side surface, and the touch sensitive portion may be at least partially located on the at least one side surface. The at least one side surface and the upper surface of the support member may be connected in a curved shape.

In another aspect, the touch sensitive portion may be integrally molded with the support member.

In a different aspect, the support member may include at least one side surface, and the touch sensitive portion may include an upper portion and at least one side portion, the upper portion of the touch sensitive portion may be located on the upper surface of the support member and may be configured to generate a first input signal, the at least one side portion may be located on the at least one side surface and may be configured to generate a second input signal different than the first input signal. A key display portion may be located at the at least one side surface of the support member. The cover may further include a protection film having a printed layer, and the key display portion may be located on the printed layer of the protection film.

In yet another aspect, a light emitting portion may be located at the at least one side surface of the support member, the light emitting portion being configured to illuminate the key display portion.

In still another aspect, the display unit may include an upper display portion located beneath the upper surface of the support member and a side display portion located behind the at least one side surface of the support member. The upper display portion and the side display portion may be integrally formed. The upper display portion may display information and may display a key area to indicate a region on the upper portion of the touch sensitive portion that can be touched to generate the first input signal.

In another aspect, the side display portion may display information, other than that displayed on the upper display portion, and may display a key area to indicate a region on the side portion of the touch sensitive portion that can be touched to generate the second input signal.

In a different aspect, the cover may include a protection film having a printed layer, and the touch sensitive portion may be located between the support member and the protection film. The touch sensitive portion may be located on a surface of the printed layer of the protection film. The protection film may be integrally molded with the support member by in-mold injection.

In still another aspect, the mobile device may include a circuitry supporting substrate located in the mobile device, and connecting terminals connected to the touch sensitive portion, the connecting terminals being configured to transmit a touch signal from the touch sensitive portion to the circuitry supporting substrate.

Another aspect of the present invention is directed to a mobile device having a cover having an upper portion and a side portion, the side portion being oriented in a different direction than the upper portion, and a display located adjacent the cover, the display having an upper portion and a side portion oriented in a different direction than the upper portion, the upper portion of the display being visible through the upper portion of the cover, and the side portion of the display being visible through the side portion of the cover.

In a further aspect, the display follows the contour of the cover.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
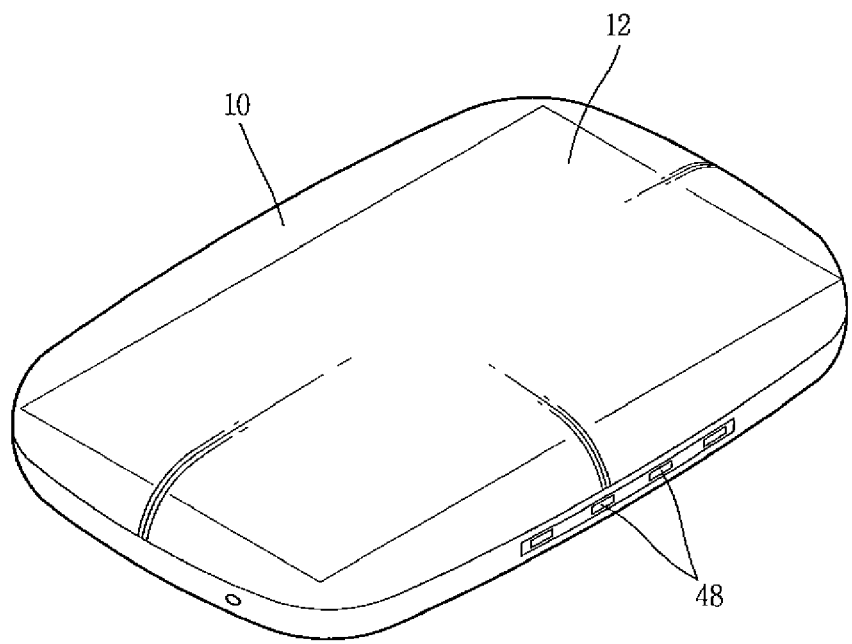
FIG. 1 is a perspective view showing a mobile device according to a first exemplary embodiment of the present invention.

Hereinafter, a mobile device, such as a portable terminal, according to the exemplary embodiments of the present invention will be explained in more detail with reference to the accompanying drawings.

As shown in FIGS. 1-4, the mobile device according to the present invention includes a cover 10, a display unit 12 located inside the cover 10, and a touch sensitive portion 34, which is also referred to as a touch input portion. The display 12 is configured to display information and is visible through the touch input portion 34. The touch input portion 34 may be integrally molded with the cover 10 at the time of molding the cover 10 and is configured to generate input when being touched.

A circuitry supporting substrate 14, such as a main circuit board, is provided for mounting various circuit components such as a communication module, etc., is located inside the cover 10. A built-in antenna 16 electrically connected to the communication module for transmitting/receiving frequencies is located inside the cover 10 along with a battery 18 that may be detachably mounted at a rear surface of the cover 10 for supplying power.

In addition, a speaker 30 may be located at one side of the cover 10 so as to output a sound to the exterior. If a bone conduction speaker for transmitting a sound through bone conduction is used, the speaker 30 does not need a speaker hole at a front surface thereof, thereby allowing for a larger display screen and improving the aesthetic appearance of the mobile device. In addition to or as an alternative to the bone conduction speaker, an air conduction speaker may also be applied to the speaker 30.

A microphone 31 may be mounted at another side of the cover 10 so as to input a sound.

Figure 2:
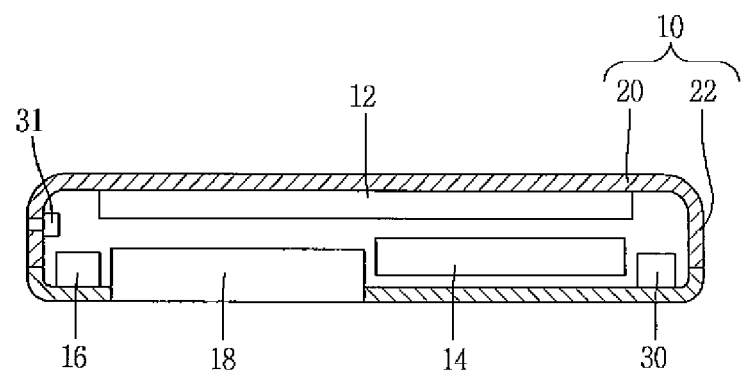
FIG. 2 is a sectional view showing the mobile device according to the first exemplary embodiment of the present invention.
Figure 3:
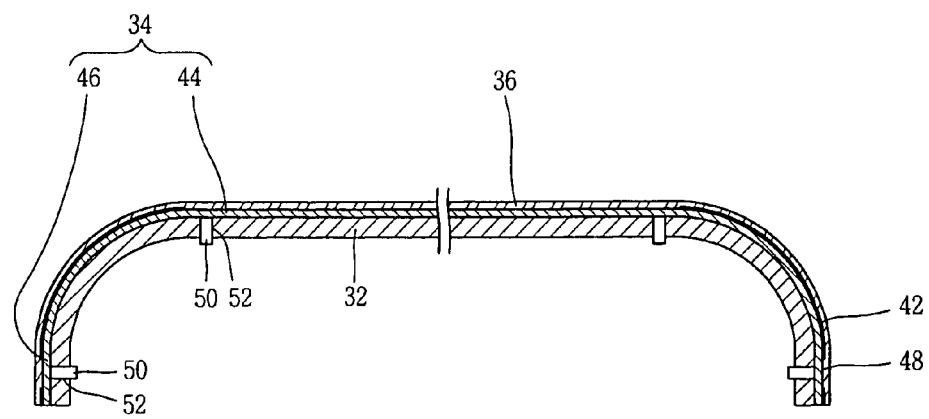
FIG. 3 is a sectional view showing a cover oft the mobile device according to the first exemplary embodiment of the present invention.

As best seen in FIGS. 2 and 3, the cover 10 includes an upper surface portion 20 forming an upper surface of the mobile device so as to show information displayed on the display unit 12 to the exterior. The cover 10 also includes a side surface portion 22 integrally molded with the upper surface portion 20, the side surface portion 22 forming a side surface of the mobile device.

Figure 4:
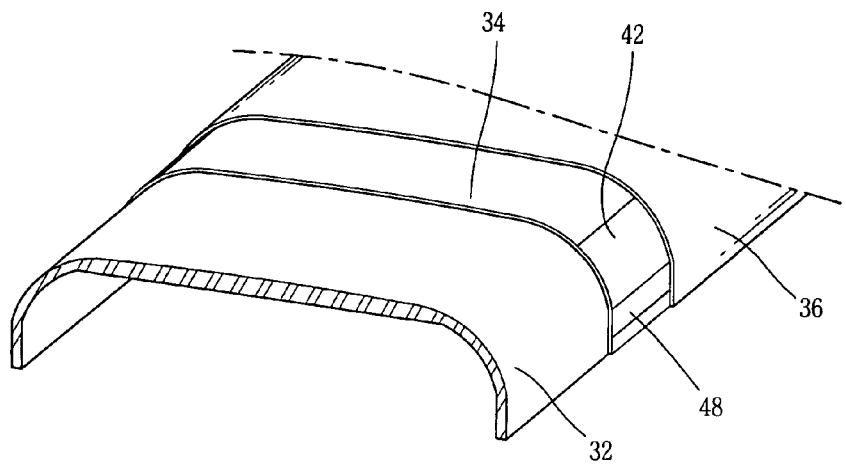
FIG. 4 is a partially cut perspective view showing the cover of the mobile device according to the first exemplary embodiment of the present invention.

As shown in FIGS. 3 and 4, the cover 10 includes a support member or base cover 32 formed of a transparent material, such a polycarbonate material, the touch input portion 34 molded on a surface of the base cover 32, a protection film 36 molded on the surface of the touch input portion 34. The cover 10 may be printed with a printed layer 42 for dividing a display area of the cover 10. It is understood that the protection film and/or printed layer 42 may be eliminated if desired.

The manufacturing process of the cover 10 will now be described. The printed layer 42 is printed on the surface of the protection film 36 so as to divide a non-transparent area where a light cannot penetrate and a transparent area where a light penetrates to make information displayed on the display unit 12 visible from the exterior. Then, the touch input portion 34 is formed on the surface of the printed layer 42. Herein, the touch input portion 34 is molded on the surface of the printed layer 42 in a pattern.

In this manner, the protection film 36 having the touch input portion 34 and the printed layer 42 therein is disposed within a female mold, and then a male mold is placed thereon, thereby injecting a resin material into cavity of the female mold. As a result, the base cover 32 having the upper surface portion 20 and the side surface portion 22 is molded, and the touch input portion 34 is molded on the surface of the base cover 32. The protection film 36 having the printed layer 42 is molded on the surface of the touch input portion 34.

As shown in FIGS. 3 and 4, the touch input portion 34 includes an upper touch portion 44 formed at the upper surface of the base cover 32 that can generate input by touching a key display portion displayed on the display unit 12. The touch input portion 34 may at least partially cover the side surface of the base cover to form a side touch portion 46 integrally formed with the upper touch portion 44. The side touch portion 46 may be configured to generate input different than that generated by the upper touch portion 44.

A key display portion 48 is formed at the side surface of the cover 10 to generate input by touching the side touch portion 46. In this exemplary embodiment, the key display portion 48 is integrally molded with the cover 10 on the printed layer 42 of the protection film 36 when the cover 10 is molded. The key display portion 48 has a shape that is visible from the side surface of the cover 10.

The upper surface portion 20 and the side surface portion 22 of the cover 10 are connected in a curved shape to enhance the appearance of the cover. In addition, since the upper surface portion 20 has a curved cross section, the contour of the cover 10 is formed in a curved shape.

Connecting terminals 50 are located at the cover 10 and are electrically connected between the touch input portion 34 and the circuitry supporting substrate 14. Herein, the manufacturing process of the connecting terminals 50 will now be described. In one embodiment, when the cover 10 is to be manufactured, the connecting terminals 50 are inserted into the mold and then the cover 10 is molded by in-mold injection. Then, the connecting terminals 50 are inserted into the base cover 32 such that one end of the connecting terminals 50 are connected to the touch input portion 34 and another end thereof are protruded into the cover 10, whereby the connecting terminals 50 may be electrically connected to the circuitry supporting substrate 14 located inside the cover 10.

Referring to another embodiment of the manufacturing process of the connecting terminals 50, terminal holes 52 are formed to insert the connecting terminals 50 therein when the cover 10 is to be molded. And, when the molding of the cover 10 has been completed, the connecting terminals 50 are inserted into the terminal holes 52, thereby having one end thereof contacted with the touch input portion 34 and another end thereof electrically connected to the circuitry supporting substrate 14.

The operation of the mobile device with the above-mentioned configuration according to the present invention will now be described in detail.

When the mobile device is turned on, a key area for generating input is displayed on the display area of the upper surface portion 20 of the cover 10. If a user touches a displayed key, a signal is inputted to the upper touch portion 44 of the touch input portion 34, thereby transmitting the inputted signal to the circuitry supporting substrate 14 through the connecting terminals 50.

Further, if the user touches the key display portion 48 formed at the side surface portion 22 of the cover 10, a signal is inputted to the side touch portion 46 of the touch input portion 34, thereby transmitting the inputted signal to the circuitry supporting substrate 14 through the connecting terminals 50.

Figure 5:
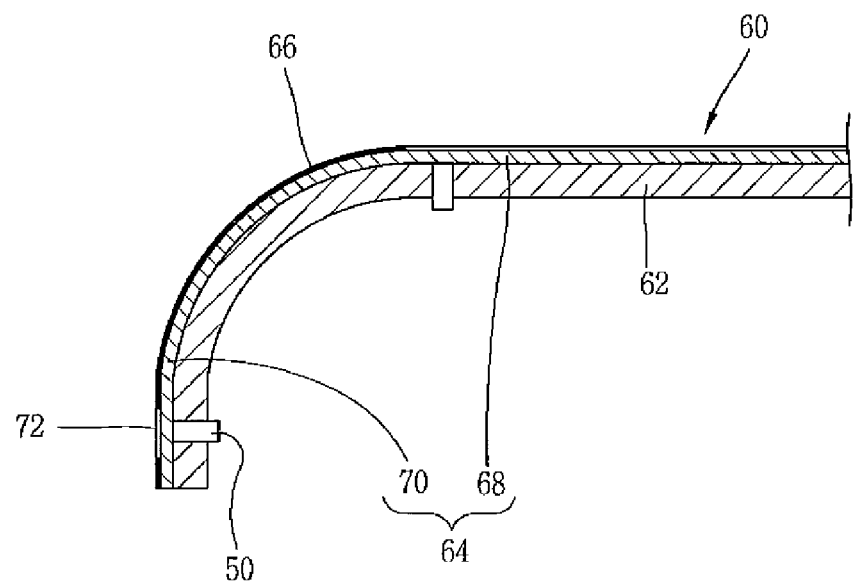
FIG. 5 is a sectional view showing a cover of a mobile device according to a second exemplary embodiment of the present invention.

As shown in FIG. 5, the cover 60 according to a second exemplary embodiment includes a support member or base cover 62 formed of a transparent material, such as polycarbonate material, a touch sensing portion or touch input portion 64 molded on a surface of the base cover 62 and configured to generate input when being touched, and a printed layer 66 molded on a surface of the touch input portion 64. The printed layer 66 divides a light-penetrating area for showing information displayed on the display unit to the exterior and a non-penetrating area for preventing the penetration of the light.

The manufacturing process of the cover 60 according to the second exemplary embodiment will now be explained. The painted layer 66 is printed on a surface of a film, and the touch input portion 64 is formed on the surface of the printed layer 66 in a pattern. Then, the film is inserted into a mold for in-mold injection, thereby molding the base cover 62. Accordingly, the touch input portion 64 is molded on the surface of the base cover 62, and the printed layer 66 is also transferred onto. If the film is removed, the touch input portion 64 and the printed layer 66 are only left on the surface of the base cover 62.

Herein, the touch input portion 64 is formed at the upper surface of the base cover 62, and includes an upper touch portion 68 and a side touch portion 70. The side touch portion 70 is integrally formed with the upper touch portion 68 and formed at the side surface of the base cover 62.

In addition, a key display portion 72 is formed at the side surface of the cover 60 so as to generate input by touching the side touch portion 70. Herein, the key display portion 72 is integrally molded with the cover 60 on the printed layer 66 when the cover 60 is molded.

Figure 6:
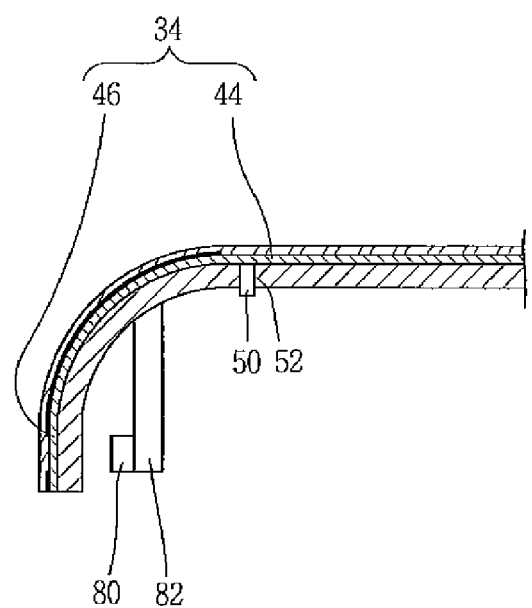
FIG. 6 is a sectional view showing a cover of a mobile device according to a third exemplary embodiment of the present invention.

As shown in FIG. 6, the cover 10 according to a third exemplary embodiment is the same as the cover 10 described in the first exemplary embodiment, except that a light emitting portion 80 is located at the side surface of the cover 10 for illuminating the key display portion 48 formed at the side surface of the cover.

The light emitting portion 80 is attached to a supporting wall 82 vertically formed at an inner surface of the cover 10, and emits the light from the light emitting portion to the side surface of the cover 10.

It is understood that the light-emitting portion may also be mounted in the same manner to the cover described in the second exemplary embodiment.

Figure 7:
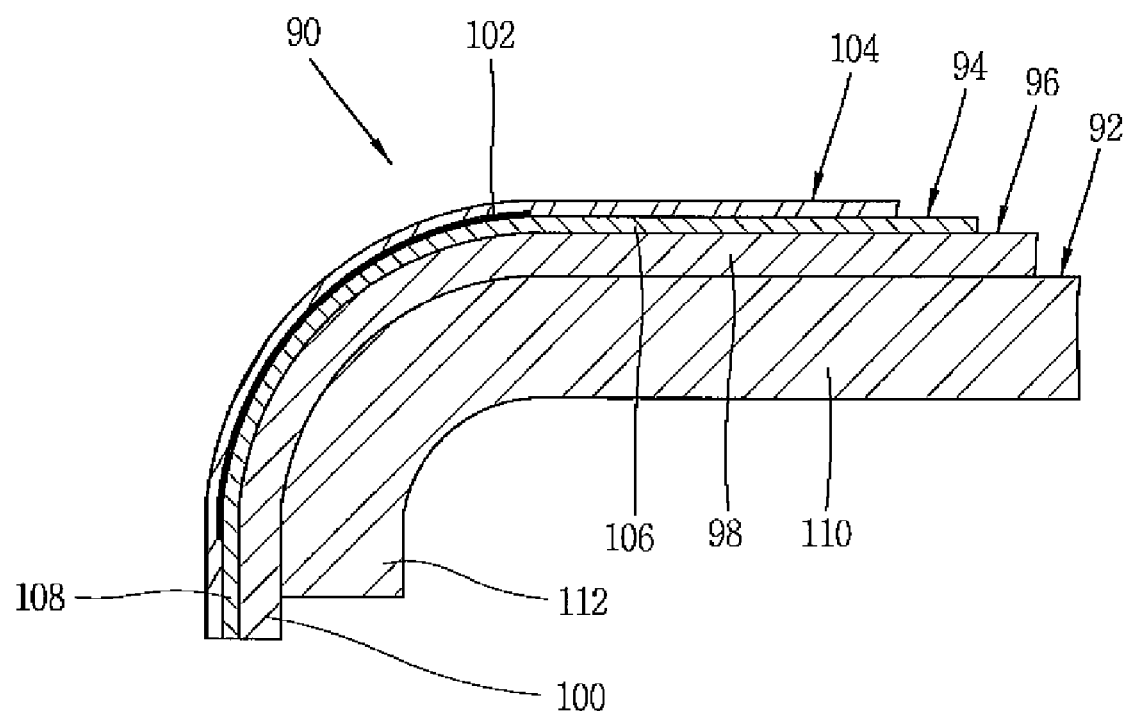
FIG. 7 is a sectional view showing a cover of a mobile device according to a fourth exemplary embodiment of the present invention.

As shown in FIG. 7, the mobile device according to a fourth exemplary embodiment includes a cover 90, a display unit 92 located adjacent the cover 90 to display information, and a touch sensing portion or touch input portion 94 being configured to generate input when being touched and being integrally molded with the cover 90 at the time of molding the cover 90.

The cover 90 is formed of a transparent material, such as a polycarbonate material, and includes a support member or base cover 96 having an upper surface portion 98 and a side surface portion 100, a touch sensing portion or touch input portion 94 molded on a surface of the base cover 96 configured to generate input when being touched, and a protection film 104 molded on the surface of the touch input portion 94. The cover 90 may be printed with a printed layer 102 for dividing a display area of the cover 90.

In this exemplary embodiment, the touch input portion 94 includes an upper touch portion 106 and a side touch portion 108. The upper touch portion 106 is formed at the upper surface portion 98 of the base cover 96 and generates input by touching a key display portion displayed on the display unit 92. And, the side touch portion 108 is integrally formed with the upper touch portion 106 and is formed at the side surface portion 100 of the base cover 96 to generate input different than that generated by the upper touch portion 106.

The display unit 92 includes an upper display portion 110 disposed at the upper surface portion 98 of the base cover 96 and a side display portion 112 disposed at the side surface portion 100 of the base cover 96. The upper display portion 110 is oriented in a different direction that the side display portion 112. As shown, the display unit 92 is bent at the edge of the upper display portion 110 in the form of a curved surface, thereby forming a side display portion 112. The upper display portion 110 displays information through the upper surface of the cover and may also display a key area for operating the upper touch portion 106. The side display portion 112 is integrally formed with the upper display portion 110 and displays information different than that displayed on the upper display portion 110 through the side surface of the cover. Also, the side display portion 112 may display a key area for operating the side touch portion 108.

In the mobile device according to the fourth exemplary embodiment, when the key area displayed on the side display portion 112 at the side surface of the cover 90 is touched, a signal is inputted to the side touch portion 108.

The above-mentioned cover may be applied to many mobile devices beyond those described in the preferred embodiments of the present invention.

As described above, the mobile device according to the present invention may integrally mold the touch input portion for generating input with the cover, thereby simplifying the manufacturing process of the terminal and reducing the thickness of the terminal without requiring a separate touch input pad.

Further, the touch input portion for generating input when being touched is extendingly formed at the side surface portion of the cover as well as the upper surface portion thereof. Accordingly, a separate side key is not required to be mounted at the side surface of the terminal for generating input, thereby simplifying the manufacturing process thus to reduce the manufacturing cost and make the enhanced appearance of the terminal.

The present invention has been explained with reference to the preferred embodiments, which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A cover for a mobile device, the cover comprising:
a support member having an upper surface; and
a touch sensitive portion located on the upper surface of the support member, the touch sensitive portion being configured to generate a signal when touched to control the mobile device,
wherein the support member includes at least one side surface, and the touch sensitive portion includes an upper portion and at least one side portion, the upper portion of the touch sensitive portion is located on the upper surface of the support member and is configured to generate a first input signal, the at least one side portion is located on the at least one side surface and is configured to generate a second input signal different than the first input signal.

2. The cover of claim 1, wherein the touch sensitive portion is located on the entire upper surface.

3. The cover of claim 2, wherein the support member is curved.

4. The cover of claim 1, further comprising a protection film located on a surface of the touch sensitive portion, the protection film including a printed layer.

5. The cover of claim 4, wherein the touch sensitive portion is located on a surface of the printed layer of the protection film.

6. The cover of claim 4, wherein the protection film is integrally molded with the support member by in-mold injection.

7. The cover of claim 1, further comprising connecting terminals connected to the touch sensitive portion, the connecting terminals being configured to transmit a touch signal from the touch sensitive portion to a circuitry supporting substrate.

8. The cover of claim 7, wherein the connecting terminals are integrally molded with the support member when the support member is molded.

9. The cover of claim 7, wherein terminal holes are located in the support member, and the connecting terminals are inserted into the terminal holes and electrically connected to the touch sensitive portion.

10. A mobile device comprising:
a cover including:
a support member having an upper surface; and
a touch sensitive portion located on the upper surface of the support member, the touch sensitive portion being configured to generate a signal when touched to control the mobile device; and
a display unit located in the mobile device,
wherein the support member includes at least one side surface, and the touch sensitive portion includes an upper portion and at least one side portion, the upper portion of the touch sensitive portion is located on the upper surface of the support member and is configured to generate a first input signal, the at least one side portion is located on the at least one side surface and is configured to generate a second input signal different than the first input signal.

11. The mobile device of claim 10, wherein the at least one side surface and the upper surface of the support member are connected in a curved shape.

12. The mobile device of claim 10, wherein the touch sensitive portion is integrally molded with the support member.

13. The mobile device of claim 10, wherein a key display portion is located at the at least one side surface of the support member.

14. The mobile device of claim 13, wherein the cover further includes a protection film having a printed layer, and the key display portion is located on the printed layer of the protection film.

15. The mobile device of claim 13, further comprising a light emitting portion located at the at least one side surface of the support member, the light emitting portion being configured to illuminate the key display portion.

16. The mobile device of claim 10, wherein the display unit includes an upper display portion located beneath the upper surface of the support member and a side display portion located behind the at least one side surface of the support member.

17. The mobile device of claim 16, wherein the upper display portion and the side display portion are integrally formed.

18. The mobile device of claim 16, wherein the upper display portion displays information and displays a key area to indicate a region on the upper portion of the touch sensitive portion that can be touched to generate the first input signal.

19. The mobile device of claim 16, wherein the side display portion displays information, other than that displayed on the upper display portion, and displays a key area to indicate a region on the side portion of the touch sensitive portion that can be touched to generate the second input signal.

20. The mobile device of claim 10, wherein the cover includes a protection film having a printed layer, and the touch sensitive portion is located between the support member and the protection film.

21. The mobile device of claim 20, wherein the touch sensitive portion is located on a surface of the printed layer of the protection film.

22. The mobile device of claim 20, wherein the protection film is integrally molded with the support member by in-mold injection.

23. The mobile device of claim 10, further comprising:

a circuitry supporting substrate located in the mobile device; and connecting terminals connected to the touch sensitive portion, the connecting terminals being configured to transmit a touch signal from the touch sensitive portion to the circuitry supporting substrate.

24. A mobile device comprising:

a cover having an upper portion and a side portion, the side portion being oriented in a different direction than the upper portion; and a display located adjacent the cover, the display having an upper portion and a side portion oriented in a different direction than the upper portion, the upper portion of the display being visible through the upper portion of the cover, and the side portion of the display being visible through the side portion of the cover, wherein the cover includes:

a support member having an upper surface; and a touch sensitive portion located on the upper surface of the support member, the touch sensitive portion being configured to generate a signal when touched to control the mobile device, wherein the support member includes at least one side surface, and the touch sensitive portion includes an upper portion and at least one side portion, the upper portion of the touch sensitive portion is located on the upper surface of the support member and is configured to generate a first input signal, the at least one side portion is located on the at least one side surface and is configured to generate a second input signal different than the first input signal.

25. The mobile device of claim 24, wherein the display follows the contour of the cover.

* * * * *